United States Patent
Carlson et al.

(10) Patent No.: US 7,208,900 B2
(45) Date of Patent: Apr. 24, 2007

(54) INDUSTRIAL ROBOT SYSTEM

(75) Inventors: Erik Carlson, Nedsoddtangen (NO); Jan Endresen, Asker (NO); Snorre Kjesbu, Slependen (NO)

(73) Assignee: ABB AB, Västerås (SE)

( * ) Notice: Subject to any disclaimer, the term of this patent is extended or adjusted under 35 U.S.C. 154(b) by 247 days.

(21) Appl. No.: 10/493,626

(22) PCT Filed: Oct. 17, 2002

(86) PCT No.: PCT/SE02/01897

§ 371 (c)(1), (2), (4) Date: Oct. 25, 2004

(87) PCT Pub. No.: WO03/036324

PCT Pub. Date: May 1, 2003

(65) Prior Publication Data

US 2005/0052148 A1    Mar. 10, 2005

(30) Foreign Application Priority Data

Oct. 23, 2001 (SE) .................................. 0103531

(51) Int. Cl.
*G05B 19/18* (2006.01)
*G06F 13/10* (2006.01)

(52) U.S. Cl. .................. 318/568.11; 318/568.12; 318/568.13; 318/567; 318/569; 701/207

(58) Field of Classification Search .............. None
See application file for complete search history.

(56) References Cited

U.S. PATENT DOCUMENTS

| 5,186,629 A | 2/1993 | Rohen |
| 5,396,266 A | 3/1995 | Brimhall |
| 5,907,491 A * | 5/1999 | Canada et al. ............. 700/108 |
| 6,158,136 A | 12/2000 | Götz et al. |
| 6,167,464 A * | 12/2000 | Kretschmann .............. 710/15 |
| 6,717,382 B2 * | 4/2004 | Graiger et al. ............. 318/587 |
| 6,792,335 B2 * | 9/2004 | Ross et al. ................. 700/245 |
| 7,013,196 B2 * | 3/2006 | Magario et al. ............ 700/204 |
| 7,027,881 B2 * | 4/2006 | Yumoto et al. .............. 700/65 |
| 2002/0188380 A1 * | 12/2002 | Ross et al. ................. 700/245 |
| 2004/0114584 A1 * | 6/2004 | Patz et al. .................. 370/362 |
| 2004/0212626 A1 * | 10/2004 | Lyxzen et al. ............. 345/589 |
| 2005/0060064 A1 * | 3/2005 | Valen et al. ............... 700/264 |
| 2005/0137746 A1 * | 6/2005 | Carlson et al. ............ 700/245 |

FOREIGN PATENT DOCUMENTS

| DE | 19638337 A1 | 3/1998 |
| DE | 20010326 U1 | 11/2000 |
| FR | 2785489 A1 | 11/1998 |
| GB | 2359648 A | 8/2001 |
| JP | 11-073201 A | 3/1999 |

* cited by examiner

*Primary Examiner*—Lincoln Donovan
*Assistant Examiner*—Eduardo Colon Santana
(74) *Attorney, Agent, or Firm*—Venable LLP; Eric J. Franklin

(57) ABSTRACT

An industrial robot including a manipulator, a control unit for controlling the manipulator, and a portable operating unit for teaching and manually operating the robot. The portable operating unit is adapted for wireless communication with the control unit and includes an operator control. The invention increases the safety by ensuring that the operator is within the specified operating area.

23 Claims, 4 Drawing Sheets

INDUSTRIAL ROBOT SYSTEM

CROSS-REFERENCE TO RELATED APPLICATIONS

This application claims priority from Swedish patent application 0103531-0 filed 23 Oct. 2001 and is the national phase of PCT/SE02/01897.

TECHNICAL FIELD

The present invention relates to an industrial robot system, including a manipulator and a control unit having means for automatically operating the manipulator. A portable operator control device is connected to the control unit having means for teaching and manually operating the manipulator. The invention also relates to a method for controlling an industrial robot system. Especially the invention relates to a communication control. Particularly the invention relates to a wireless teach pendant unit.

An operator control device is a portable operator control device denoted a teach pendant unit, TPU, in the following. A TPU normally comprises operator control means and a visual display unit. The operator control means usually is a joystick, a ball, a set of buttons or any combination of these.

BACKGROUND OF THE INVENTION

An industrial robot is programmed to carry out work or a work cycle along an operating path. In order to program or teach the robot the work cycle, the robot is manipulated to positions along the desired operating path. These positions are stored as instructions in a memory in the control unit. Other information, such as desired robot movement velocity, may also be stored in the memory. During operation of the robot, the program instructions are executed, thereby making the robot operate as desired.

A robot is operated in at least two modes: automatic and manual. By switching a mode selector key on a control panel on the control unit, the choice of mode, in which the robot shall operate, is made. When the robot is in the manual mode, the TPU has the exclusive right to operate the robot and thus no other operating control device or control unit is allowed to control the robot.

An industrial robot is usually placed in robot cells in order to facilitate the automation of a complex series of actions under safe conditions. When one of the robots in a robot cell is to be operated under manual control using a TPU, it is important that the TPU is communicating with and controlling the right robot. Thus, in order to accomplish a safe control of an industrial robot, it is important to have absolute confidence in the control of the robot. The operator must be fully aware of the current mode of the connection between the control unit and the TPU.

In an industrial robot system where the TPU is connected to the control unit by a cable, the operator can easily be aware of the current mode of said connection. The cable is preferably shielded and no other communication systems can interfere with the two connected units. Under normal conditions the control unit periodically transmits data to the TPU. Upon receiving this data the TPU responds by transmitting a response signal back to the control unit. Thus, the control unit asks the TPU if this is in operation. The control unit judges from said response signal if the TPU is in normal condition. If the emergency switch has been activated, the response signal carries that information and the control unit executes the emergency stop. The length of the cable defines the maximum distance between a TPU cable connected to an industrial robot and the control unit.

In an abnormal situation, e.g. when the operating unit is disconnected or the cable is cut off, the TPU does not transmit a responding signal. The absence of a responding signal is a sign to the control unit that there is an emergency stop situation and the control unit will activate the emergency stop.

However, the TPU cable ends up entangled on the floor in industrial robot systems with several robots and hence several cables. The cables are often lying on the floor and there is an obvious risk of damage by a vehicle running over. There is also a risk of cable entanglement by which an operator will have difficulties in knowing which TPU belongs to which robot. Furthermore, a TPU connected by cable to a control unit limits the degree of freedom that an operator needs to perform an effective operation with the robot.

In accordance with the conditions mentioned above, the development of industrial robot systems is in one way leading to a wireless TPU for the robot control. A wireless connection eliminates most of the negative consequences of using a cable connection. On the other hand, a wireless connection introduces some problems of its own. Most notable is the problem of ensuring that the TPU is associated with the correct robot and the problem of verifying that the wireless connection works correctly.

In both cases, there is a risk of personal injury if the operator believes that he is operating and controlling a certain robot but instead is out of contact with this particular robot. Thus, there is a strong need to ensure connection between the robot and the TPU when using a TPU not physically connected to the robot. In other words, it is of great importance that the operator is immediately made aware of a sudden communication loss of the TPU. Since the operator usually is concentrated on the robot and there may be a great deal of ambient noise, the usual warnings (blinking light, buzzer) are ineffective and not reliable.

One security arrangement in an industrial robot system with a robot working in a cell is designed as follows. If something abnormal happens in the cell, an operation stop is activated and the operating robot is stopped and remains standing still. After reestablishment of a normal condition in the cell, the robot will be restarted. In this situation, a stopped robot does not disturb the rest of the robot system. Then, there is a higher degree of security stop and that is the emergency stop for stopping the whole robot system. This is activated when something extraordinary happens somewhere in the robot system. Closing down the whole robot system is undesirable since it necessitates a great deal of work for the operator to return the system to operation conditions.

From the Japanese patent application 11-73201, a wireless control system is previously known. The object of the invention is to provide a communication system wherein the specific communication of emergency stop control can be carried out by wireless means in a manner equivalent to cable communication. The solution of the invention is in the design of the system with data exchange by means of wireless or optical communication between a first device and a second device. The first device comprises a transmitting part and a receiving part. The second device comprises a receiving part and a transmitting part, which returns arbitrary data in response to data received from said first device at a normal time, and stops said response at an abnormal condition. The first device judges the condition to be abnormal by recognizing the received data to be arbitrary data. It also judges the condition to be normal by recognizing the received data to be specific data. Thus, specific communications such as emergency stop control is carried out by wireless means in a manner equivalent to the prior cable communication, and the system is made fail-safe.

A wireless connection is less predictable than a wired connection, and the communication between the TPU and the control unit may fail, be loosen or be broken by the system due to either distance, signal interference, radio shadow, current interruptions or battery failure, all of which will cause a communication loss. All different communication losses are denoted "a broken data link" and all different operating communications are denoted "a connected data link" in the following.

If a broken data link occurs, arrangements required by safety regulations will immediately stop the robot. These security arrangements are further programmed to measure the time for the robot standing still in accordance with the situation mentioned above. When the robot has been standing still for a predetermined time due to the broken data link, the emergency stop is activated and all activities in the cell will be stopped. The time between these events is chosen in order to comply with the safety regulations in force.

Despite necessity of security systems, a sudden shutdown of a robot system is a very frustrating situation for the operator. It requires time and energy for realizing the situation. It also takes a great deal of effort and time to reestablish the working condition in the robot system. This is a situation every operator is anxious to avoid, especially when there is no reason for the stop.

According to the conditions mentioned above, there is a need for an industrial robot system including a TPU, which system has the function of immediately making an operator aware of a broken data link. More precisely, there is a need for a TPU, which has the character of immediately indicating a broken data link to an operator carrying the TPU.

SUMMARY OF THE INVENTION

The object of the invention is to provide an industrial robot system, which makes it possible for an operator carrying a portable TPU connected to the system to work in an increased operation area, flexibly and effectively without being worried about where the position of the TPU. A second object of the invention is to facilitate the work with a portable TPU, for operating an industrial robot system, defined above and additionally to avoid unnecessary emergency stops.

These objects are achieved according to the invention in a first aspect with an industrial robot system comprising the characteristic features of the independent claim 1, in a second aspect with a method for controlling an industrial robot system comprising the characteristic features of the independent method claim 14. According to the invention, these objects also are achieved in a data program product comprising the characteristic features of the independent claim 23, and a use of the method according to claims 26. Preferred embodiments are described in the dependent claims.

According to the invention, one or a plurality of robots are controlled by one TPU unit. Each TPU is communicating with the control unit locally. There is a limit built into the system as to how far from the control unit a TPU is allowed to operate. Thus, there is a maximum operating distance for the TPU, which distance usually varies in different directions around the control unit. Often, the maximum distance comprises intervals defined not to allow operation. Therefore, distances together with directions define one or a plurality of work areas A within which the TPU is allowed connection to the control unit under secure conditions. These distances, directions and defined areas are invisible but an important security limitation since an operator has difficulties in knowing where to be positioned.

When an activated TPU is moved away from the control unit longer than the mentioned maximum operating distance, the system is programmed to break the connection to the control unit. Thus, if an operator, bringing a wireless TPU connected to the robot, is walking too far away from the control unit, the control unit will break the data link to the TPU. The data link will also be broken when the TPU positioned in a defined work area A suddenly passes the border into the exterior area. Thus, it is an object of the invention to connect/disconnect a TPU due to the exact position of the TPU. Therefore, the position determining means according to the invention is provided to operate with a high degree of accuracy with the result that the exactness of the safety in the robot system increases desirably.

The solution according to the first aspect of the invention is to provide an industrial robot system with at least one industrial robot comprising a manipulator, a control unit comprising a processor for controlling the manipulator, a portable operator control device, TPU, for teaching and manually operating the robot. The system comprises means provided to determine the exact position of the TPU.

According to the invention, the position determining means comprises a reference station including means for sending a signal to the TPU, where the TPU is arranged to retransmit a reply signal. The position determining means further comprises at least one receiving means, for receiving the transmitted reply signal from the TPU.

In one embodiment of the invention, the position determining means comprises means for measuring time. A signal is transmitted from a reference station comprising means for transmitting and receiving a signal and the time measuring means. According to the invention, the time measuring means is measuring a time interval starting when the signal is sent to the TPU and ending when receiving the retransmitted reply signal from the TPU. In this embodiment, the reference station includes a radio tower and the receiving means includes an antenna means.

In another embodiment of the invention, the position determining means is arranged to measure angle/direction. Two reference stations, provided with receiving means, are sending signals to the TPU and receive the retransmitted reply signal from the TPU. The position of the TPU is then obtained by triangulation.

In another embodiment of the invention, the position determining means is arranged to measure distance. Two reference stations, submitted in accordance with the previous embodiment, are sending signals to the TPU and are further provided for determining their respective distance to the TPU. The position of the TPU is determined on the basis of the measured distances and a calculated intersection point.

According to the invention, the position determining means is measuring distance, direction or a combination of distance and direction. It is possible to simplify the position determining problem to a two-dimensional problem, which can be applicable to a robot operator. By adding a third reference station, the positing is done in a three-dimensional space. This combined solution has the added benefit that only one reference station is needed.

According to the invention, indicating means is arranged in the TPU for indicating to the operator that the TPU is positioned outside the defined area A and consequently that the data link is broken. The indicating means indicates the broken data link through tactile feedback by touch perception to the body of the operator. According to the invention, the indicating means is either an active or a passive indicating means. The operator is usually carrying the TPU and both the active and passive indication through physical perception is a tactile feedback to the hand.

An active indicating means is defined to create a mechanical force, which transfers information to an operator, without the operator asking for it. In one embodiment of the invention, the active indicating means comprises vibrating means operable to vibrate due to a broken data link. In another embodiment, the vibrating means is included in the TPU. In another embodiment, he vibrating means is included in an operator control means. According to the invention, the operator control means is a joystick operable to vibrate due to a broken data link. In yet another embodiment of the invention, the active indicating means is arranged to indicate by means of light, sound or a combination thereof.

A passive indicating means is defined to create a mechanical movement reaction, which is arranged to be stiffer or looser upon indication. According the invention, the passive indicating means is included in an operator control means. In one embodiment, the operator control is arranged to introduce a mechanical resistance to movement during operation, when the data link is communicating in a normal way. Upon a broken data link, the passive indicating means is arranged to loosen the resistance to movement in the operator control means. In one embodiment of the invention, the operator control means is a joystick and the passive indicating means comprises resilient means operable to introduce a mechanical resistance to manual movement of the joystick. A passive indication includes a mechanical movement reaction created by loosening the mechanical resistance.

The solution according to the second aspect of the invention is to provide a method for control of an industrial robot system with an industrial robot comprising a manipulator, a control unit comprising a processor and a portable TPU. The TPU communicates with the control unit via a data link for manually programming and operating the manipulator. One or a plurality of work areas A is defined for the TPU. Position determining means determine the exact position of the TPU. The robot control system is programmed to break the data link when the TPU is determined to be positioned outside the work area A and programmed to continue the data link communication when the TPU is determined to be positioned within the work area A.

According to the invention, the position of the TPU is determined continuously on the basis of a signal sent to the TPU from at least one reference station comprised in the position determining means. The signal is retransmitted from the TPU in the form of a reply signal, which is received by at least one receiving means comprised in the position determining means.

In one embodiment of the invention, the position determining means is brought to measure the time interval between sending a signal and receiving the transmitted reply signal.

In another embodiment of the invention, the position determining means is brought to measure the respective distance between the TPU and two separate reference stations by means of retransmitted reply signals from the TPU.

In yet another embodiment of the invention, the position determining means is brought to measure the respective direction between the TPU and two separate reference stations by means of retransmitted reply signals from the TPU.

In yet another embodiment of the invention, the position determining means is brought to measure both the distance and the direction between the TPU and a single reference station by means of a retransmitted reply signal from the TPU.

According to the invention, the position of the TPU is determined continuously.

According to one embodiment of the invention, the data link in the industrial robot system is a wireless data link. In another embodiment of the invention, the link is a radio link connected to and communicating through a network. In yet another embodiment, the TPU comprises a unit sold under the name of Bluetooth.

For a wireless TPU the enforcement of the work area is not easy. According to the invention, a wireless positioning system, radio based or otherwise, is used to locate the wireless TPU and its operator and thereby enforce the applicable work area. The positioning system is a separate system or an integral part of the radio communication system used by the wireless TPU for normal operation and emergency stop commands.

In one embodiment of the invention, the data link is operable due to both a steady stream of command messages from the control unit to the TPU and messages in response from the TPU back to the control unit. The control unit is operable to break the data link through breaking the stream of command messages.

In another embodiment of the invention, the data link is operable due to both a steady stream of command messages from the TPU to the control unit and messages in response from the control unit to the TPU. The industrial robot system is operable to break the data link through breaking the stream of response messages.

In yet another embodiment of the invention, the industrial robot system is operable to break the data link through an instruction from the control unit.

According to the invention, the physical medium for the positioning system is sound, ultrasound, light or electromagnetic radiation.

According to the methods mentioned above, a broken data link is due to a broken stream of command messages or is due to a broken stream of response messages. In another method according to the invention, the data link is broken due to an instruction from the control unit.

The security arrangements are programmed to in some way accept the TPU getting closer to the control unit within said chosen time limit. Consequently, if the TPU comes close enough to the control unit, or alternatively enters a work area A in due time, the operation stop will be reset and the robot reactivated. According to the invention, the display of the TPU gives information to the operator concerning the reason for a broken data link. In one embodiment, the display also informs the operator in which direction he and the TPU shall move for entering the area A. Then, the operator has the possibility to move fast into the area A and thereby avoiding a sudden shutdown of the robot system. The solution according to the invention increases the accuracy of the control of the industrial robot system.

According to the invention, the position determining means is arranged to operate in a whole factory or in a smaller area within the factory. Furthermore, the position determining means comprises at least on e roof mounted receiving means for determining the position of the TPU in three dimensions.

BRIEF DESCRIPTION OF THE DRAWING

The invention will be explained in more detail by the description of different embodiments thereof and with reference to the appended drawings in which.

DESCRIPTION OF THE PREFERRED EMBODIMENTS

Figure 1:
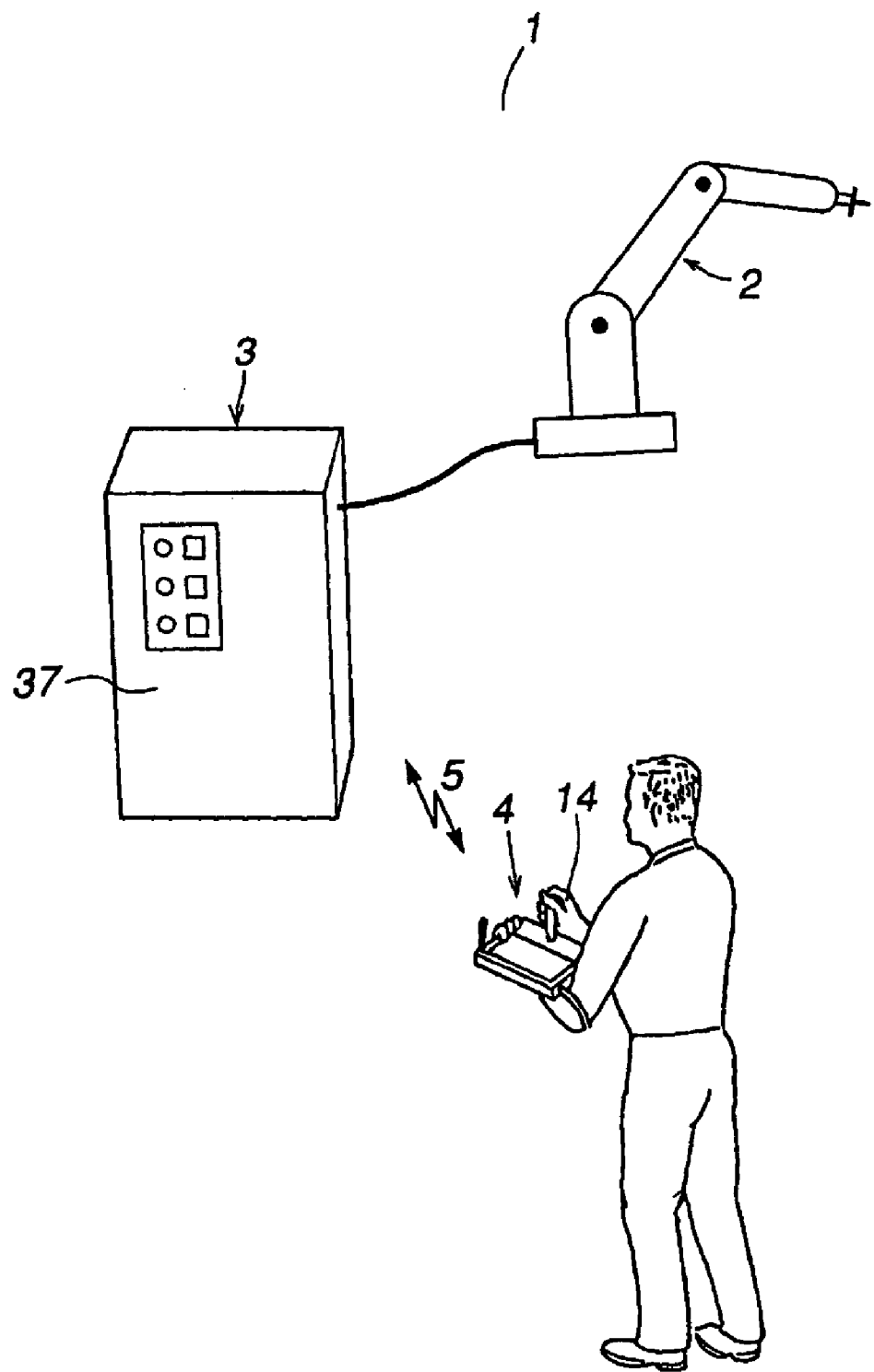
FIG. 1 is a wireless communication system according to the invention.

FIG. 1 is a communication system comprising an industrial robot 1, including a manipulator 2 and a control unit 3 for controlling the manipulator. A TPU 4, for teaching and manually operating the manipulator, is communicating with the control unit 3 via a wireless data link 5. The TPU includes an antenna 6 for wireless communication with the control unit 3.

Figure 2:
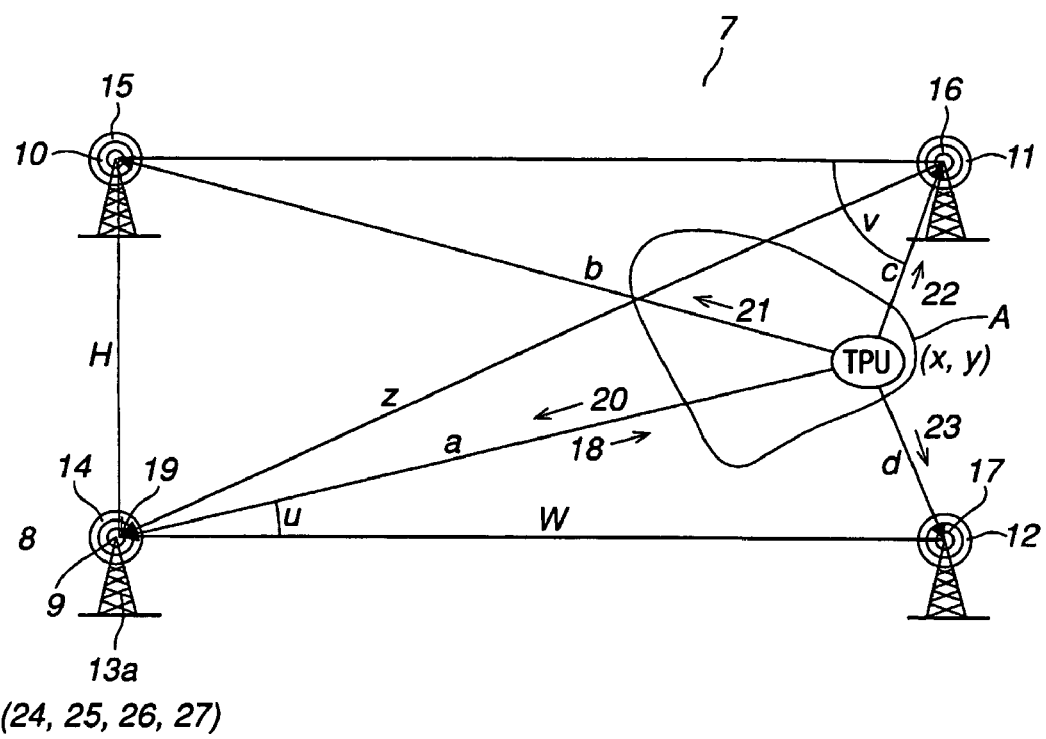
FIG. 2 is a position determining means, in accordance with the invention, comprising four reference stations, one of which comprises a transmitter.

In FIG. 2, the position determining means 7 comprises a reference station 8 including a first radio tower 9 and means for measuring time 13a. Another three radio towers 10, 11 and 12 are arranged at a distance from each other and from the reference station 8. Each radio tower 9, 10, 11 and 12, respectively, comprises a signal receiving means 14, 15, 16 and 17, respectively. A signal 18 is sent to the TPU 4 from a transmitter 19 arranged in the reference station 8. The time measuring means 13a is measuring a time interval starting when the signal 18 is sent to the TPU 4 and ending when the respective receiving means 14, 15, 16 and 17 receive a retransmitted reply signal 20, 21, 22 and 23, respectively, from the TPU 4 in accordance with the following.

The reference station 8 includes the transmitter 19 for sending a radio signal 18 to the TPU. The TPU receives the signal 18 and retransmits a reply signal 20, 21, 22 and 23 to the four radio towers and respective signal receiving means 14, 15, 16 and 17.

The first radio tower 9 comprises the signal receiving means 14, which receives the retransmitted reply signal 20. The second radio tower 10 is connected by a radio link H to the first radio tower 9 and transmits the reply signal 21 on the link H to the first radio tower 9. The third radio tower 11 is connected by a radio link Z to the first radio tower 9 and transmits the reply signal 22 on the link Z to the first radio tower 9. The fourth radio tower 12 is connected by a radio link W to the first radio tower 9 and transmits the reply signal 23 on the link W to the first radio tower 9.

A set of high-speed timers 24, 25, 26 and 27 is arranged in the first radio tower 9 and are activated simultaneously when a signal 18 is transmitted to the TPU. The signal 18 is retransmitted by the reply signals 20, 21, 22 and 23 received at respective radio towers 10, 1—1 and 12. The reply signals 21, 22 and 23 are then transmitted via the respective radio links to the reference station 8. The timer 24, 25, 26 and 27, respectively is stopped when is has registered the corresponding reply signal 20, 21, 22 and 23. The position of the TPU is then calculated on the basis of the known parameters for the positions of the four radio towers and the speed of the signal propagation in combination with the measured time intervals. In this embodiment, the time measuring means are synchronized. In FIG. 2, the four radio towers are arranged forming a rectangle and this is one embodiment of the invention. This arrangement also gives the possibility to determine the position of the TPU in two or three dimensions.

Figure 3:
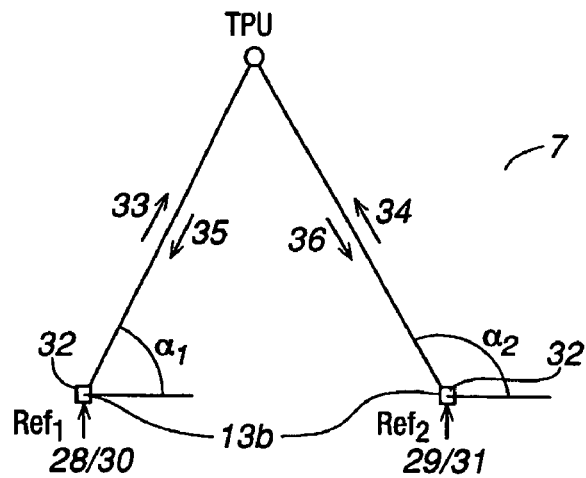
FIG. 3 is a position determining means, in accordance with the invention, comprising two reference stations measuring direction.

According to the invention, one alternative is an arrangement with one reference station and two radio towers, which provides the possibility to determine the position of the TPU in two dimensions. In FIG. 3 two reference stations 28 and 29 are arranged separated from each other. The respective reference station 28, 29 comprises receiving means 30, 31, each including an antenna means 32. The reference station 28 and 29, respectively, is arranged to transmit a signal 33 and 34, respectively, to the TPU 4 and measuring means 13b measure the angle/direction of respective retransmitted reply signals 35 and 36 from the TPU. In one embodiment, the two reference stations 28 and 29 are transmitting at two different frequencies. The position of the TPU is then obtained by triangulation. The position determining means is determining the position of the TPU in three dimensions when a third reference station is provided for (not shown).

Figure 4:
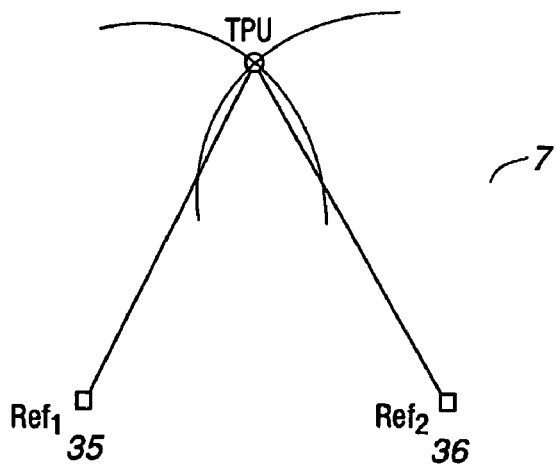
FIG. 4 is a position determining means, in accordance with the invention, comprising two reference stations measuring distance.

FIG. 4 is the same embodiment as FIG. 3 except for one difference: the position of the TPU is determined by measuring the distance between the TPU and the respective reference station. The position is obtained by the intersection of two circles, each around the respective reference station, which has the measure distance as the radius. The distances can be measured by the time of the arrival of a retransmitted reply signal sent by the TPU, if the TPU and the reference stations are synchronized. The time of arrival can be converted into distance since the speed of the signal propagation is known. In another embodiment, the distance is obtained by measuring the round-trip delays. The position determining means 7 is determining the position of the TPU in three dimensions when a third reference station is provided for (not shown).

Figure 5:
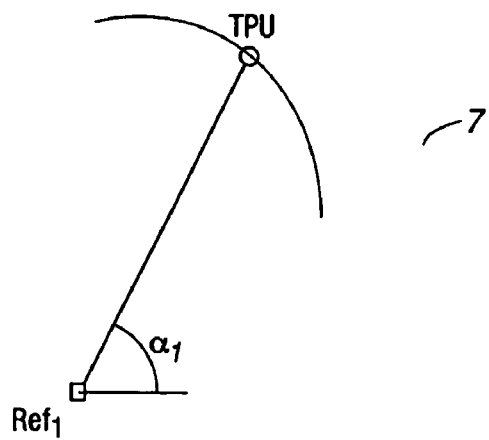
FIG. 5 is a position determining means, in accordance with the invention, comprising one reference station measuring both direction and distance.

FIG. 5 shows in the two-dimensional case where the position of the TPU is determined by combining the two methods described in FIGS. 3 and 4.

The control of the industrial robot system, defined above, is operated as follows. One or a plurality of work areas A are defined for the TPU and the corresponding data information is programmed and stored in the processor of the control unit 37. The position determining means 7 determines the position of the TPU 4 and the corresponding information is stored in the processor 37. The processor is provided to compare the position of the TPU with the position of a work area A. The processor 37 is further provided to break the data link 5 when the TPU 4 is positioned outside the work area A. Further, the processor 37 is provided to continue communication of the data link when the TPU is positioned within the work area A.

Figure 6:
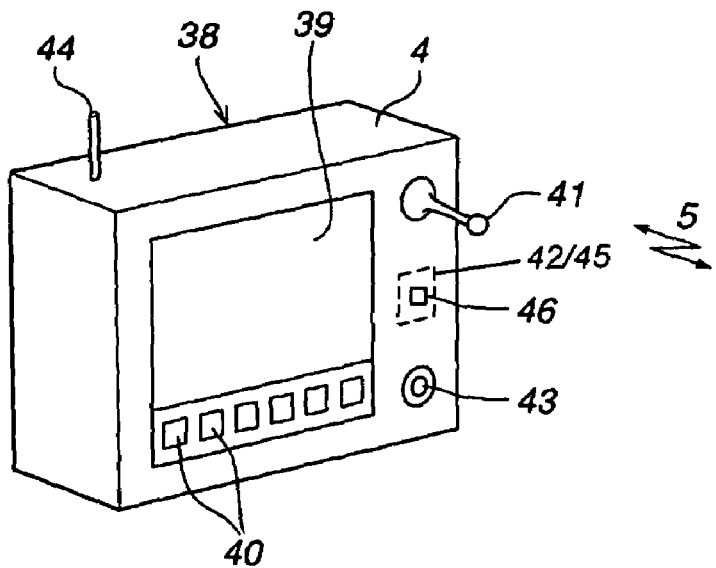
FIG. 6 is a TPU according to the invention.

FIG. 6 is a TPU 4 according to the invention. The TPU 4 comprises a portable box 38 including a display means 39, function keys 40, a joystick 41, indicating means 42 and an emergency stop device 43. The TPU includes an antenna 44 for wireless communication with the control unit 3. The indicating means 42 is arranged to actively or passively indicate to the operator a broken data link 5. The TPU comprises active indicating means 45, which comprises vibrating means 46, arranged, integrated into the TPU 4. Upon a broken data link 5, the active indicating means 45 is activated and the vibrating means 46 starts to vibrate. This vibration is, during operation, an active indication to the operator that the data link 5 is broken. This tactile feedback is brought by touch perception to the body 47 of an operator bringing the TPU 4. In one embodiment of the invention, the active indicating means 45 comprises vibrating means 46 arranged integrated into a joystick 41 (not shown).

The reference station comprises an antenna means. According to the invention, the antenna means comprises a beam-shaped antenna, a steerable antenna or an antenna with multiple receiving elements, which measure the relative phase between the elements (not shown).

According to the invention, a joystick comprises passive indicating means. The passive indicating mean is integrated into the joystick and is arranged to introduce a mechanical resistance to manual movement of the joystick. The passive indicating means comprises resilient means arranged to passively indicate to the operator a broken data link by a mechanical movement reaction created by loosening or stiffening the mechanical resistance.

Figure 7:
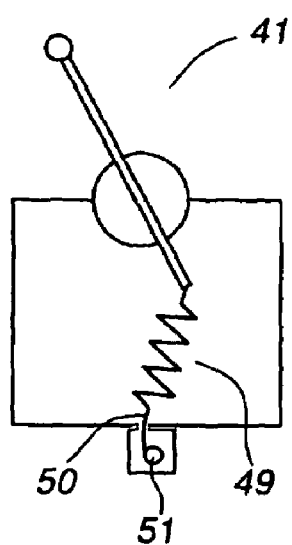
FIG. 7 is a schematic cross section of a joystick comprising a resilient means including a regulating means creating mechanical resistance to movement of the joystick.
Figure 8:
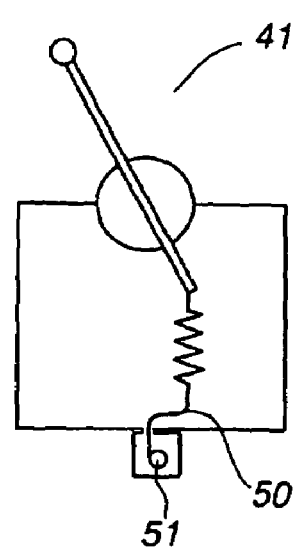
FIG. 8 shows the joystick in FIG. 7 in a relaxed position lacking mechanical resistance to movement.

FIG. 7 is a joystick 41, which comprises one helical spring 49 arranged vertically and provided with a thread 50 connecting the helical spring and a resilience control means 51. In this embodiment, the mechanical resistance to movement is provided for by means of only one helical spring. In FIG. 7 the joystick is arranged to create a mechanical movement reaction, which is arranged to be looser upon indication a broken data link 5. In FIG. 8, the joystick 41 is indicating a broken data link 5 through the relaxed thread 50. In another embodiment of the invention, a joystick comprises While only certain preferred features of the present invention have been illustrated and described, many modifications and changes will be apparent to those skilled in the art. It is therefore to be understood that all such modifications and changes of the present invention fall within the scope of the claims.

The invention claimed is:

1. An industrial robot system, comprising:
   an industrial robot comprising a manipulator, a control unit for controlling the manipulator, at least one portable operator control device for teaching and manually operating the robot, wherein the operator control device is adapted for communication with the control unit through a data link;
   a defined working area for the operator control device;
   means to determine the position of the operator control device; and
   an indicator operative to indicate a mode of the data link, wherein the indicator is operable to physically indicate a communication failure of the data link through tactile feedback by touch perception to the body of an operator of the operator control device during operation;
   wherein the data link is broken/disconnected upon the operator control device being outside the defined working area, or the data link is connected upon the operator control device being inside the working area.

2. The industrial robot system according to claim 1, wherein the indicator is arranged to indicate actively through vibrations.

3. The industrial robot system according to claim 1, wherein the indicator is arranged to indicate passively through resilient means operable to introduce a mechanical resistance to movement of an operator control means.

4. The industrial robot system according to claim 1, wherein the position determining means comprises at least one reference station arranged to send a radio signal to the operator control device.

5. The industrial robot system according to claims 4, wherein the reference station comprises at least one receiver operative to receive a transmitted reply signal from the operator control device.

6. The industrial robot system according to claim 5, wherein the position determining means comprises means for measuring the time between transmitting the signal and receiving the reply signal.

7. The industrial robot system according to claim 5, wherein the position determining means comprises means for measuring direction/angle between the transmitted signal and the received reply signal.

8. The industrial robot system according to claim 1, wherein the position determining means comprises at least one receiver operative to receive a transmitted reply signal from the operator control device.

9. The industrial robot system according to claim 8, wherein the at least one receiver comprises an antenna.

10. The industrial robot system according to claim 1, wherein the control unit is operable to define a work area.

11. The industrial robot system according to claim 1, wherein the data link is a wireless data link.

12. A method for controlling an industrial robot system comprising an industrial robot comprising a manipulator, a control unit comprising a processor for controlling the manipulator, at least one portable operator control device for teaching and manually operating the robot, wherein the operator control device is adapted for communication with the control unit via a data link, the method comprising:
   defining a working area for the operator control device;
   determining the position of the operator control device;
   indicating a mode of the data link, wherein a communication failure of the data link is physically indicated to an operator through tactile feedback by touch perception to the operator during operation;
   breaking/disconnecting the data link upon the operator control device being outside the working area; and
   connecting the data link upon the operator control device being inside the working area.

13. The method according to claim 12, further comprising:
   sending a signal with position determining means to the operator control device.

14. The method according to claim 13, further comprising:
   transmitting with the operator control device at least one transmitted reply signal; and
   receiving at least one transmitted reply signal with the position determining means.

15. The method according to claim 14, further comprising:
   measuring with the position measuring means a time between transmitting the signal and receiving the at least one transmitted reply signal.

16. The method according to claim 14, further comprising:

measuring with the position determining means the distance between the operator control device and a reference station.

17. The method according to claim 14, further comprising:

measuring with the position determining means a direction between the operator control device and a plurality of reference stations.

18. The method according to claim 14, further comprising:

measuring with the position determining means both a direction and a distance between the operator control device and a reference station.

19. The method according to claim 12, wherein the position of the operator control device is determined continuously.

20. The method according to claim 12, further comprising:

breaking the data link with the control unit.

21. A computer program product, comprising:
a computer readable medium; and
computer program instructions recorded on the computer readable medium and executable by a processor, for performing the steps of
defining a working area for the operator control device,
determining the position of the operator control device,
indicating a mode of the data link, wherein a communication failure of the data link is physically indicated to an operator through tactile feedback by touch perception to the operator during operation,
breaking/disconnecting the data link upon the operator control device being outside the working area, and
connecting the data link upon the operator control device being inside the working area.

22. The computer program product according to claim 21, wherein the computer program instructions are further for carrying out the step of at least partly supplying the computer program instructions over a network.

23. The computer program product according to claim 21, wherein the computer program instructions are further for carrying out the step of at least partly supplying the computer program instructions over the Internet.

* * * * *